June 11, 1963  H. K. BUSCHER, SR  3,092,914
GAUGE AMPLIFIER
Filed Sept. 8, 1960

INVENTOR.
HAROLD K. BUSCHER, SR.
BY
Lockwood, Woodard, Smith & Weikart
Attorneys

United States Patent Office 3,092,914
Patented June 11, 1963

3,092,914
GAUGE AMPLIFIER
Harold K. Buscher, Sr., 2346 W. King St., Kokomo, Ind.
Filed Sept. 8, 1960, Ser. No. 54,776
10 Claims. (Cl. 33—169)

The present invention relates to an improved gauge and to a subcombination thereof, a gauge amplifier, which finds a primary utility as a part of a gauge of the type adapted to check the depth of a bore for the purpose of determining whether said depth is within the limits of permissible tolerance.

There are gauges commercially available for measuring the depth of a bore and for determining whether said depth is between certain limits. At least one type of such gauge incorporates spheres arranged to transmit and amplify linear movement. Frequently, such sphere-incorporated gauges are subjected to jolts which, upon being transmitted through the gauge, tend to damage and flatten the spheres at the points where said spheres contact contiguous parts whereby errors in readings are caused. Also, such sphere-type gauges are frequently rendered inaccurate by dirt infiltrating the operating parts of the gauge.

Thus, an important object of the present invention is to provide a gauge and gauge amplifier which is highly resistant to damage by shock and which is constructed to resist infiltration of dirt into the working parts of the amplifier.

Further objects of the present invention are to provide an improved gauge and to provide an improved gauge amplifier.

Another object of the invention is to provide a gauge which does not require dials and which indicates results automatically and immediately.

Still another object of the present invention is to provide an improved gauge amplifier which may be quickly and inexpensively modified for jobs requiring different tolerances.

Related objects and advantages will become apparent as the description proceeds.

The full nature of the invention will be understood from the accompanying drawings and the following description and claims.

Figure 1:
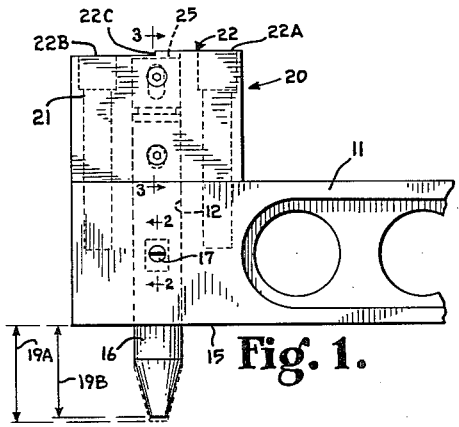
FIG. 1 is a side elevation of a gauge embodying the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
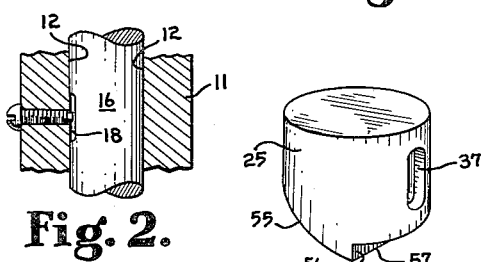
FIG. 2 is a vertical section taken along the lines 2—2 of FIG. 1 in the direction of the arrows.
Figure 5:
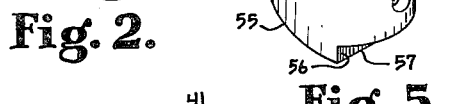
FIGS. 5–8 are perspective views of four of the internal parts of the amplifier portion of the gauge.
Figure 8:
Figure 7:

Referring now more particularly to the drawings, there is illustrated in FIG. 1 a gauge 10 including the bar 11 having a vertically extending bore 12 therethrough which extends perpendicularly to and which opens on a flat surface 15 of the bar 11. A cone pointed pin 16 is reciprocably received within the bore 12, the reciprocation being limited by a set-screw 17 threaded within the wall of the bar 11 and extending into a recess 18 in the side of the pin 16. It can be seen from FIGS. 1 and 2 that the recess 18 is so proportioned as to prevent the pin from falling downwardly out of the bore 12 and also from moving upwardly an excessive distance.

The primary use of the gauge of FIG. 1 is to measure the depth of a bore in a manufactured item being produced in large quantities so that those of the items which have bores exceeding or less than the desired depth may be found and rejected. Thus, in order to measure such an item, the cone pointed pin 16 is projected into the bore until the flat surface 15 engages the portion of the item surrounding the bore. Depending upon the depth of the bore, the pin might project from the bar 11 an amount, for example, equal to the dimension 19A or the dimension 19B. A gauge amplifier 20 is secured to the upper surface of the bar 11 and functions to magnify the movements of the pin 16 so that difference between the dimensions 19A and 19B or any other dimensions measured by the pin 16 is much more evident and easily read.

The gauge amplifier 20 comprises an oblong casing 21 fixed to the upper surface of the bar 11 and having a top surface 22 divided into two rectangular segments disposed at two levels, the segment at high level being marked 22A, the lower segment being marked 22B and the two segments being connected by a substantially vertical step 22C. The amplifier includes a cylindrical upper pin 25 arranged to project from the upper end of the casing 21. The amplifier has incorporated therein certain mechanical means which connect the movements of the probing pin 16 and the upper pin 25 so that any movement of the probing pin 16 is multiplied by five times in the upper pin 25. Thus, if the surfaces 22A and 22B are separated by an amount equal to the allowed tolerance multiplied by five, the operator can quickly tell by the location of the upper pin (either between or outside of the surfaces 22A and 22B) whether or not the part meets the required tolerance standards.

Referring more particularly to FIGS. 3–8, the amplifier is shown in detail and includes a vertically extending bore 26 which receives the upper pin 25, a cant disc 28 and a lower cylindrical pin 27. The bore 26 is arranged in registry with the bore 12 in the bar 11 so that the lower pin 27 moves with the probing pin 16. The lower pin 27 has a rectangular recess 30 in the sidewall thereof which receives the dog point 31 of a set screw 32 threadedly received within the sidewall of the casing 21.

Figure 4:
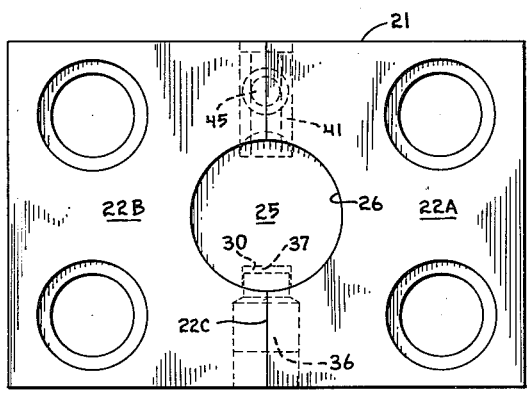
FIG. 4 is a top plan view of the amplifier portion of the gauge of FIG. 1.
Figure 3:
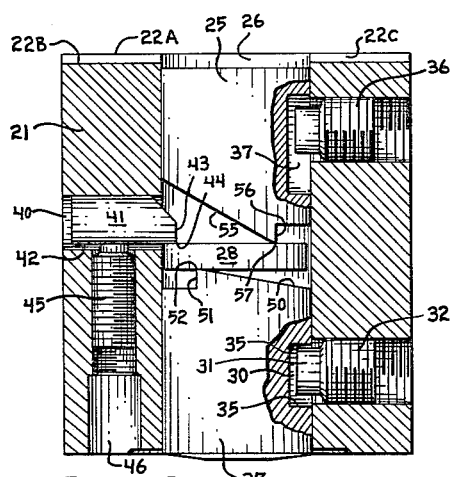
FIG. 3 is a vertical section through the amplifier portion of the gauge of FIG. 1 taken along the line 3—3 of FIG. 1.

Referring to FIG. 4, it can be seen that the width of the recess 30 is approximately equal to and only slightly larger than the diameter of the dog point of the set screw 32. For this reason, the lower pin 27 is prevented from rotating within the bore 26. The set screw 32 also functions to limit the longitudinal movement of the pin 27 in the bore 26, the ends 35 of the recess engaging the dog point of the set screw for this purpose.

A similar set screw 36 is threadedly received within the wall of the casing 21 and has its dog point extending into a recess 37 similar to the recess 30. In like manner, the set screw 36 prevents rotation of the upper pin 25 within the bore 26, the dog point and the recess having equal lateral dimensions to the set screw and recesses 32 and 30. It should be noted that the recess 37 has a somewhat greater length than the recess 30 because movements of the lower pin 27 are amplified in the upper pin 25.

Received within a suitable bore 40 in the sidewall of the casing is a generally cylindrical stop pin 41. The pin 41 is provided with a shaved off, flat lower portion 42 which, together with a flat end 43 on the pin, defines a straight edge 44 which is arranged in the present device perpendicular to the length of the bore 26. The straight edge 44 is held in this position by means of a set screw 45 which is threadedly received within bore 46 and engages the flat lower surface 42 of the stop pin and holds the stop pin in tight engagement with the upper portion of the bore 40.

The cant disc 28 is received within the bore 26 below the stop pin 41 and between the upper and lower pins 25 and 27, the cant disc 28 functioning to amplify the movement of the pin 27 in the pin 25. The pin 27 is provided with a tapering upper surface 50 and a vertically extending surface 51, the two surfaces meeting to form a straight edge 52. The upper surface of the pin 27 is so arranged that the straight edge 52 is located fairly close to the straight edge 44 of the stop pin 41. The upper pin 25 is formed with a tapering surface 55 which meets vertically extending surface 56 to form a straight edge 57, the straight edge 57 being located a substantially greater distance from the straight edge 44 than is the straight edge 52.

It can be appreciated that when the lower pin 27 is moved upwardly forcing against the cant disc 28, the disc will pivot about the straight edge 44 and will amplify the movement of the lower pin in the upper pin an amount depending upon the distance of the two straight edges 52 and 57 from the straight edge 44. By adjustment of the position of the stop pin 41, this amplification may be varied; however, in the present embodiment of the invention, this amplification is set at five times.

By the use of the straight edges 44, 52 and 57 to transmit moving force through the cant disc 28, a structure is provided which is highly resistant to damage by shock. In other words, it is necessary for the shock to deform the pins 41, 25 or 27 all along the length of their straight edges in order to produce inaccuracy whereas the point contact of a sphere with its contiguous parts is highly vulnerable to shock damage. Also the particular structure of the present gauge amplifier has high resistance to dirt infiltrating the working parts thereof because the pins 41, 25 and 27 and the set screws 32, 36 and 45 fill the various bores and prevent dirt from passing through the bores into the area of the cant disc 28 to interfere with the operation of the gauge amplifier.

These objects and advantages are achieved in the present invention with a relatively inexpensive and uncomplicated structure. From the above description, it can also be appreciated that the present invention provides an improved gauge and gauge amplifier which does not require dials and which indicates results automatically and immediately.

Figure 9:
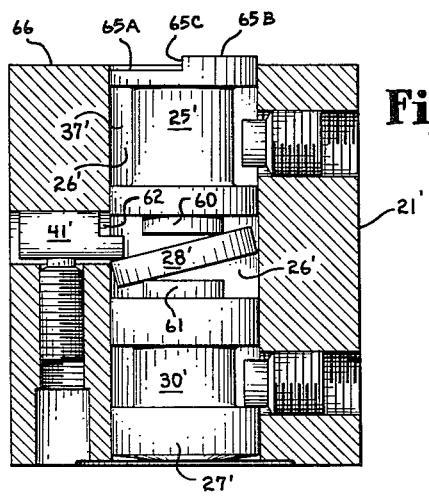
FIG. 9 is a vertical section similar to FIG. 3 of an alternative amplifier portion of the gauge of FIG. 1.
Figure 6:
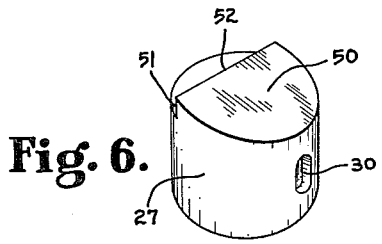

Referring to FIG. 9, an alternative form of the invention is illustrated which does not provide some of the advantages of the above described structure but includes certain other advantages. The device of FIG. 9 is identical to the device of FIGS. 1-8 with the following exceptions. The upper pin 25', instead of having rectangular recess 37, is provided with an annular recess 37', permitting the upper pin 37' to rotate in the bore 26'. Similarly the lower pin 27' is provided with an annular recess 30' permitting rotation of pin 27' in the bore 26'.

Instead of the projecting straight edges 52 and 57, the pins 25' and 27' have cylindrical projections 60 and 61 arranged coaxially with respect to their respective pins 25' and 27'. The cant disc 28' has the same construction as cant disc 28. Stop pin 41' is identical to stop pin 41 with the exception that pin 41' is provided with a recess 62 so that greater downward limit of movement of the pin 25' is permitted.

It should also be noted that instead of the "limits defining" step in the casing 21 defined by surfaces 22A, 22B and 22C, the pin 25' has a step formed by surfaces 65A, 65B and 65C and the casing 21' has a flat upper surface 66. Thus, the pin 25', which can be replaced much more inexpensively than the casing 21, permits inexpensive modification of structure for jobs requiring different tolerances.

Both the primary and alternative embodiments above described permit plating of the pins 25, 25', 27 and 27' as well as discs 28 and 28' or black oxide treatment thereof (similar to gun finishes) and/or the use of non-ferrous alloys such as carbides or stellites whereas the sphere type gauges mentioned in column 1 of the specification use conventional steel spheres. The alternative embodiment of FIG. 9 has the same dirt resisting qualities as the embodiment of FIGS. 1-8 and operates in substantially the same manner with the cant disc 28' acting as a lever.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An amplifying gauge comprising a body with a flat surface, said body having an aperture therethrough opening at one end on and extending perpendicularly to said flat surface, a pin slidably mounted in said aperture and extending from said flat surface, a casing fixed to said body and having a bore in registry with said aperture at the other end thereof, a pair of cylindrical pins slidably received in close fitting relation in the bore of said casing, said cylindrical pins having recesses in the sidewalls thereof, set screws received in the sidewall of said casing and projecting into said recesses to prevent rotation and excessive longitudinal movement of said cylindrical pins, a fulcrum element extending into said bore, said fulcrum element having a straight edge thereon which is perpendicular to the length of said bore, said cylindrical pins having at their mutually facing ends projecting portions each defining a straight edge at its distal end, the straight edge of each of said distal ends being parallel to the straight edge of said fulcrum element, and a disc received within the bore between said cylindrical pins and bearing against said straight edges, one of said cylindrical pins engaging said first mentioned pin and having its straight edge closer to the straight edge of said fulcrum element than is the straight edge of said other pin, said casing having a pair of parallel flat surfaces on the face thereof away from said body, said flat surfaces being joined by a step perpendicular to said flat surfaces.

2. An amplifying gauge comprising a body with a flat surface, said body having an aperture therethrough opening at one end on and extending perpendicularly to said flat surface, a pin slidably mounted in said aperture and extending from said flat surface, a casing fixed to said body and having a bore in registry with said aperture at the other end thereof, a pair of cylindrical pins slidably received in said bore in axial alignment and having approximately the same diameter as said bore, said last mentioned pins having mutually facing ends with parallel projecting straight edges thereon, a lever received within said bore between said last mentioned pins and pivotal with relation to said casing, said lever having flat surfaces against which said straight edges bear, said straight edges being parallel to and unequally spaced from the pivotal axis of said lever.

3. An amplifying gauge comprising a body with a flat surface, said body having an aperture therethrough opening at one end on and extending perpendicularly to said flat surface, a pin slidably mounted in said aperture and extending from said flat surface, a casing fixed to said body and having an opening extending therethrough in registry with said aperture at the other end thereof, a pair of pins slidably received in said opening, said pins having the same cross section as said opening and being spaced in the direction of extent of said opening, and a lever within the opening between said last mentioned pins.

4. A gauge amplifier comprising a casing having a bore therethrough, a pair of cylindrical pins slidably received in close fitting relation in said bore, said pins having rectangular recesses in the sidewalls thereof, dog pointed set screws received in the sidewalls of said casing and projecting into said recesses to prevent rotation and excessive longitudinal movement of said cylindrical pins, a fulcrum element extending into said bore, means for adjusting the extension of said fulcrum element and for locking said fulcrum element in position, said fulcrum element having a projecting straight edge thereon which is perpendicular to the length of said bore, said pins having mutually facing ends upon which are projecting portions each defining a straight edge at its distal end, the straight edge of each of said distal ends being parallel to the straight edge of said fulcrum element, and a disc received within the bore between said cylindrical pins and bearing against said straight edges, one of said cylindrical pins having its straight edge farther away from the straight edge of said fulcrum element than is the straight edge of said other pin, said casing having a pair of outer parallel flat surfaces intersecting said bore, said other pin having a flat end perpendicular to the axis of said other pin and arranged to pass said flat surfaces as said other pin slides in said bore, said flat surfaces being joined by a step perpendicular to said flat surfaces.

5. A gauge amplifier comprising a casing having a bore therethrough, a pair of cylindrical pins slidably received in close fitting relation in said bore in axial alignment, said pins having mutually facing ends with projecting straight edges thereon, said straight edges being perpendicular to the length of said bore, means for locking said pins against rotation in said bore with said straight edges in parallel relation, a fulcrum element having a straight edge projecting into said bore between said pins, means for adjustably locking said fulcrum element with said straight edge in parallel relation to the straight edges of said pins, a flat disc received within said bore between said pins whereby said straight edges can bear against said disc, one of said pins having its straight edge farther away from the straight edge of said fulcrum element than is the straight edge of said other pin, said casing having a pair of parallel flat surfaces intersecting said bore, said other pin having a flat end perpendicular to the axis of said other pin and arranged to pass said flat surfaces as said other pin slides in said bore.

6. A gauge amplifier comprising a casing having a bore therethrough, a pair of pins slidably received in said bore in axial alignment, said pins having approximately the same diameter as said bore and having mutually facing ends with parallel projecting straight edges thereon, a lever received within the bore between said pins and pivotal with relation to said casing, said lever having flat surfaces against which said straight edges bear, said straight edges being parallel to and unequally spaced from the pivotal axis of said lever.

7. A gauge amplifier comprising a casing having an opening therethrough, a pair of pins slidably received in said opening, said pins having the same cross section as said opening and a lever within the opening between said pins.

8. An amplifying gauge comprising a body with a flat surface, said body having an aperture therethrough opening at one end on and extending perpendicularly to said flat surface, a pin slidably mounted in said aperture and extending from said flat surface, a casing fixed to said body and having a bore in registry with said aperture at the other end thereof, a pair of cylindrical pins slidably received in close fitting relation in the bore of said casing, said cylindrical pins having annular recesses in the side walls thereof, set screws received in the side wall of said casing and projecting into said recesses to prevent excessive longitudinal movement of said cylindrical pins, a fulcrum element extending into said bore, said fulcrum element having a straight edge thereon which is perpendicular to the length of said bore, said cylindrical pins having at their mutually facing ends projecting portions each in the form of a cylinder coaxially located with respect to the respective pin thereof, and a disc received between said cylindrical pins and bearing against said cylindrical portions and against the straight edge of said fulcrum element whereby movement of one cylindrical pin toward the other cylindrical pin causes pivoting of the disc about the straight edge and movement of the other cylindrical pin.

9. A gauge amplifier comprising a casing having a bore therethrough, a pair of pins received in said bore in axial alignment, said pins having the same diameter as said bore and having mutually facing ends with projecting cylindrical portions thereon, said portions being coaxial with their respective pins, a lever received within the bore between said pins and pivotal with respect to said casing, said lever having flat surfaces against which said cylindrical portions bear.

10. A gauge amplifier comprising a casing having an opening therethrough, a pair of pins received in said opening, a lever within the opening between said pins, said pins having the same cross section as said opening, said casing having a flat surface upon which said opening opens, one of said pins having an end which can pass said flat surface as said one pin slides in said bore, said end being formed with a pair of parallel flat surfaces.

References Cited in the file of this patent

UNITED STATES PATENTS

| | | |
|---|---|---|
| 1,032,739 | Caswell | July 16, 1912 |
| 1,129,289 | Grant | Feb. 23, 1915 |
| 2,546,513 | Lovenston | Mar. 27, 1951 |
| 2,811,780 | Martin | Nov. 5, 1957 |

FOREIGN PATENTS

| | | |
|---|---|---|
| 875,541 | France | June 22, 1942 |